UNITED STATES PATENT OFFICE.

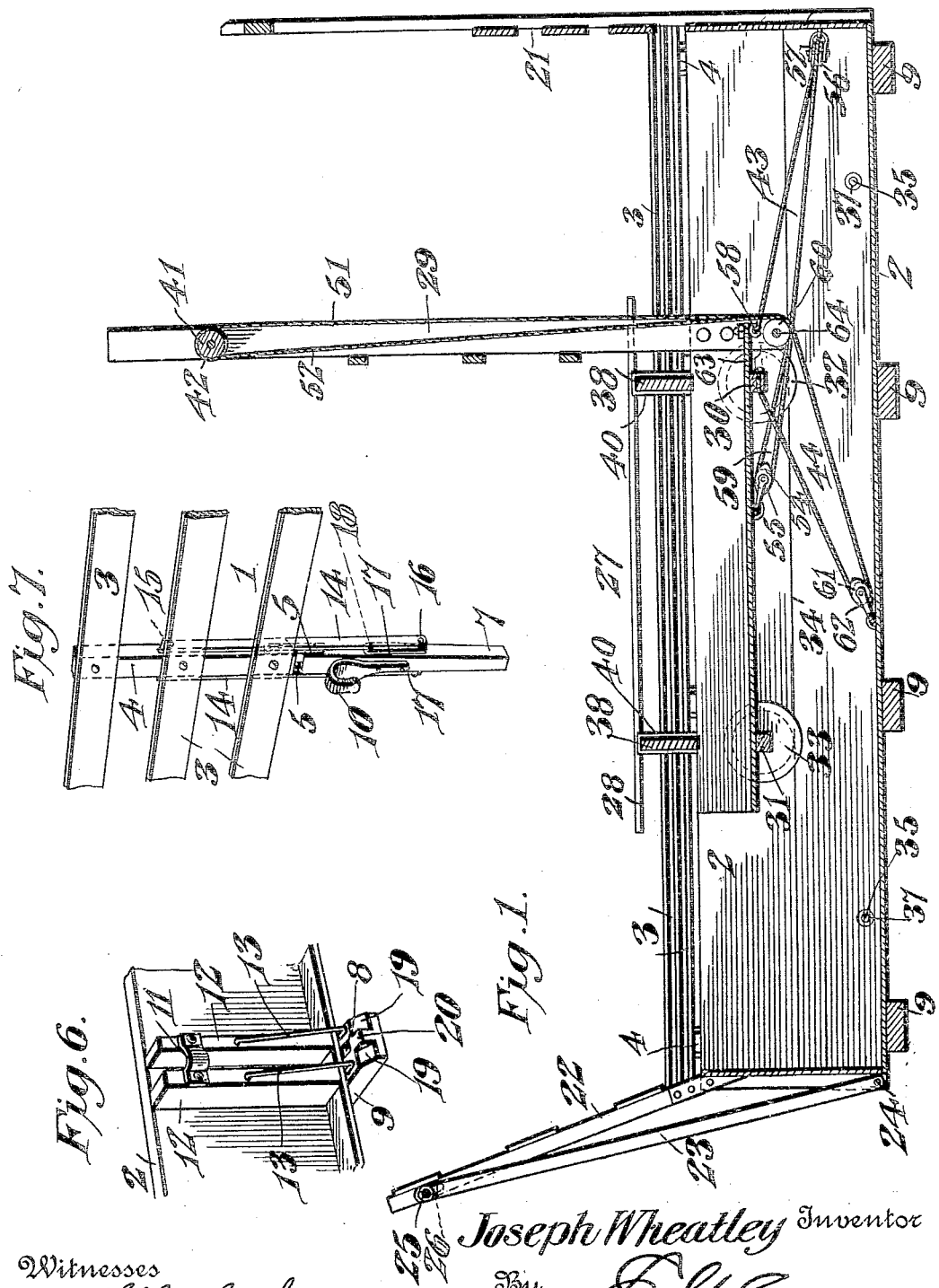

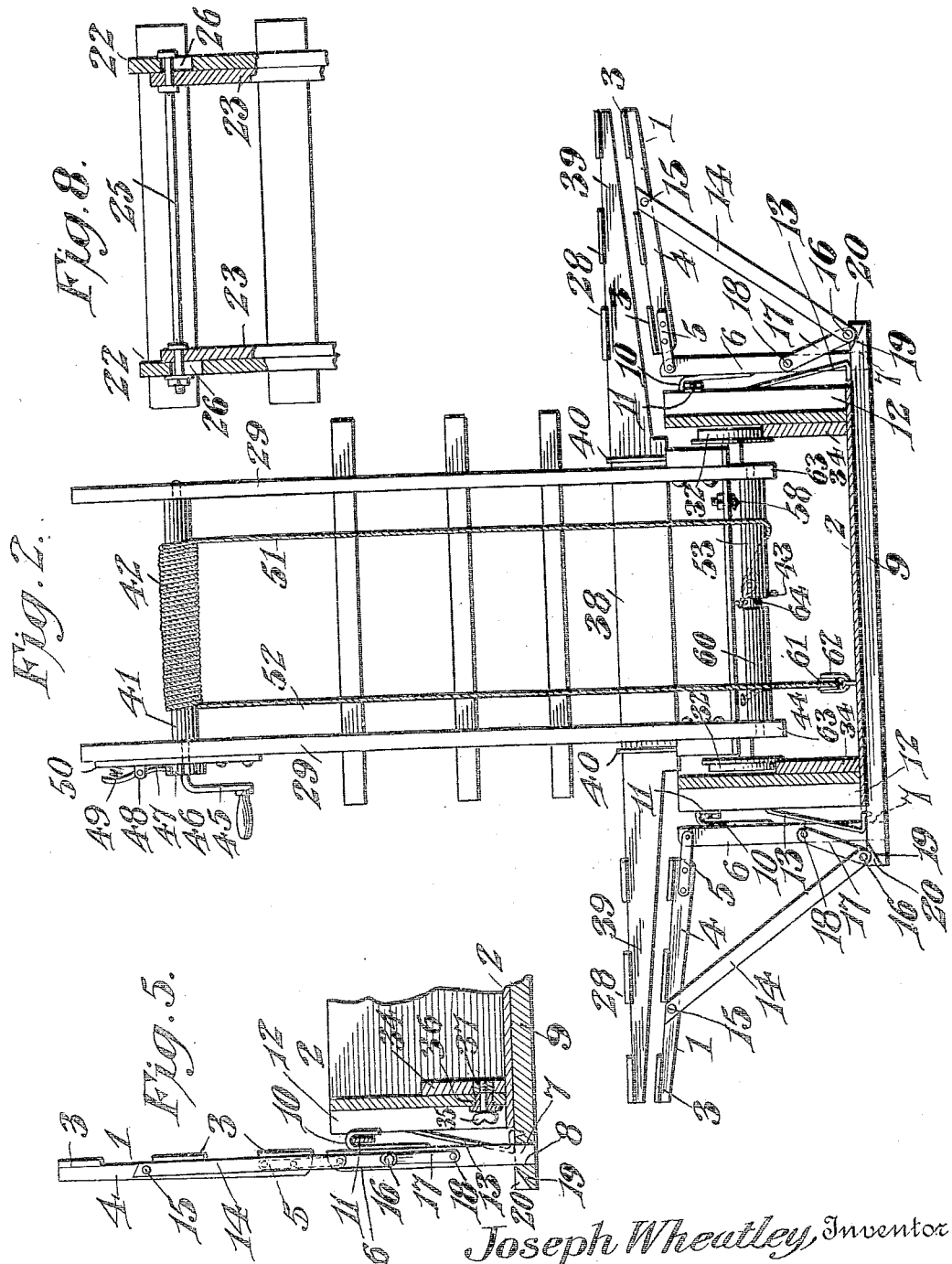

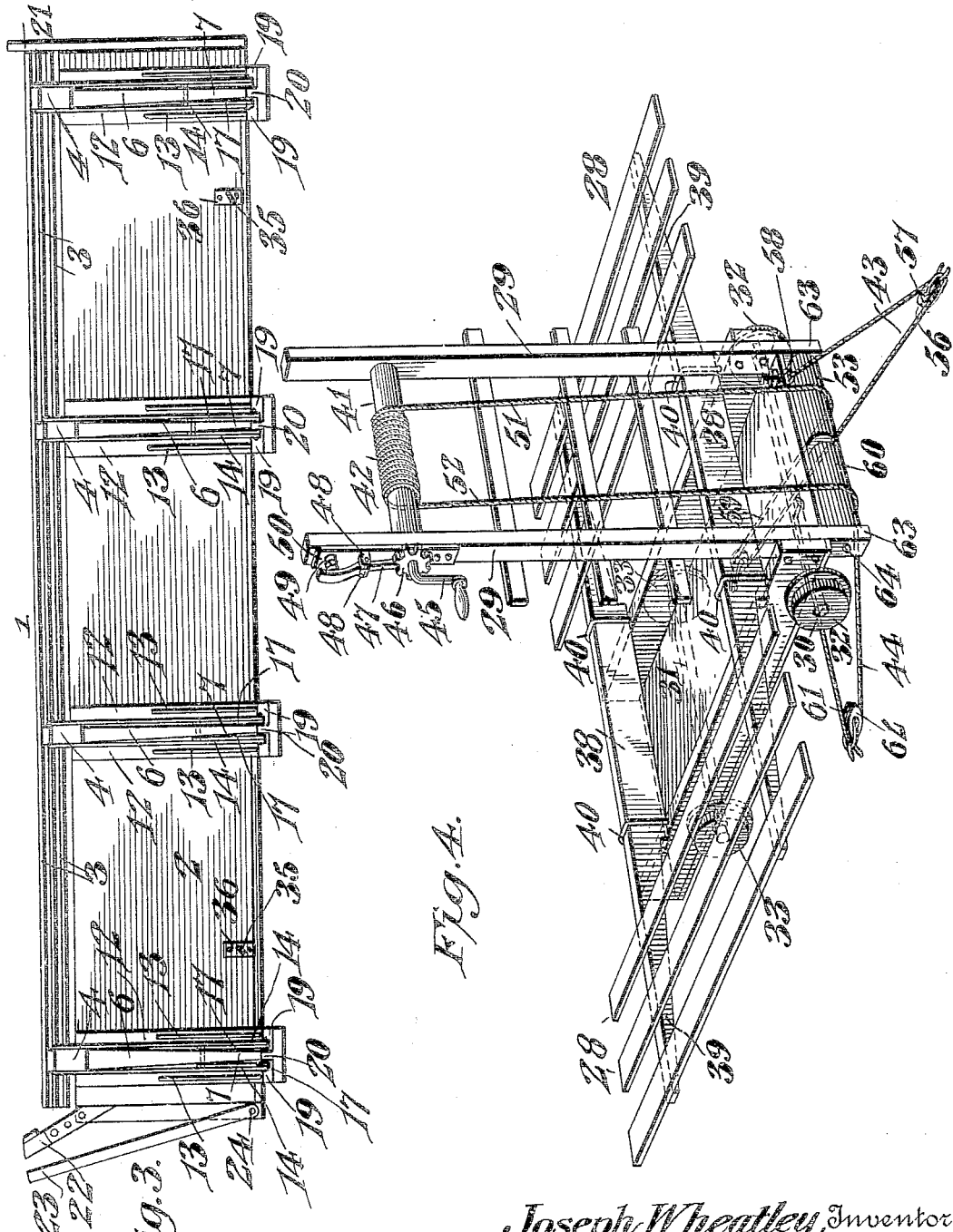

JOSEPH WHEATLEY, OF HARLOCK, ONTARIO, CANADA.

HAY-LOADER RACK.

953,569.

Specification of Letters Patent. Patented Mar. 29, 1910.

Application filed July 28, 1908. Serial No. 445,721.

*To all whom it may concern:*

Be it known that I, JOSEPH WHEATLEY, a subject of the King of Great Britain, residing at Harlock, in the Province of Ontario and Dominion of Canada, have invented a new and useful Hay-Loader Rack, of which the following is a specification.

The invention relates to improvements in hay loader racks.
The object of the present invention is to improve the construction of hay loader racks, and to provide a simple and comparatively inexpensive hay rack equipped with a hay loader, adapted to enable one man to do the work, which usually requires two.

A further object of the invention is to provide a hay loader of this character, adapted, when the rear half of the load has been placed on the hay rack, to be readily operated to transfer the partial load to the front portion of the hay rack, so that the rest of the load may also be placed on the hay rack at the rear portion thereof.

The invention also has for its object to provide a hay loader, adapted to be readily removed from the hay rack to enable the same to be converted into a stock rack, or to be used as an ordinary wagon.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a longitudinal sectional view of a hay rack equipped with a hay loader, constructed in accordance with this invention. Fig. 2 is a transverse sectional view of the same. Fig. 3 is a side elevation of the hay rack, the hay loader being removed. Fig. 4 is a perspective view of the hay loader removed from the hay rack. Fig. 5 is a vertical sectional view of one side of the wagon, showing one side of the rack arranged in a vertical position to form a stock rack. Fig. 6 is a detail perspective view of a portion of the wagon, illustrating the arrangement of the stand- ards and the construction of the bolster for supporting the sides of the rack. Fig. 7 is a detail perspective view of a portion of one of the sides of the rack. Fig. 8 is a rear view, illustrating the construction of the rear end of the rack.

Like numerals of reference designate corresponding parts in all the figures of the drawings.

The sides 1 of the hay rack are detachably mounted on an ordinary wagon body or box 2 and adapted to be removed therefrom to enable the vehicle to be used as an ordinary wagon, and the said sides 1, which are detachable, are hinged to swing upward and downward to arrange them either in an inclined position, as illustrated in Figs. 2 and 3 of the drawings to form a hay rack, or in a vertical position, as shown in Fig. 5 to form a stock rack. The sides 1 are composed of spaced longitudinal slats 3 and transverse connecting bars 4, which are provided at their inner ends with spaced projecting metallic straps or pieces 5, extending longitudinally from the connecting bars 4 and receiving and pivoted to the upper ends of the vertical standards 6.

The vertical standards 6 have lower tapered ends 7 to fit in sockets 8 of bottom cleats 9 of the wagon body, and they are equipped at their upper portions with hooks 10, arranged to engage coöperating keepers 11, consisting of horizontally disposed metallic straps or plates, bowed outwardly at an intermediate point and secured at their terminals at the outer edges of vertical bars or standards 12 of the wagon body. The vertical bars or standards 12, which are arranged exteriorly of the sides of the wagon body, are disposed in pairs, and they are located above the bottom cleats 9, which project laterally from opposite sides of the wagon body. The sockets 8 are preferably formed by openings, and the fixed vertical standards 12 of the wagon body are braced by inclined rods 13, extending upwardly from the projecting terminals of the bottom cleats 9, and connected to the standards 12 at points intermediate of the ends thereof.

The hinged sides 1 are supported in their inclined position by braces 14, pivoted at their upper ends 15 to the transverse connecting bars 4 at points intermediate of the ends thereof, and pivotally connected at their lower ends by rivets 16, or other suitable fastening devices to the outer ends of the links 17, which are pivoted at their other ends 18 to the removable standards 6 at points intermediate of the ends thereof. The link connection between the lower ends of the braces 14 and the standard 6 permits the hinged side to swing upward and downward, and when the hay rack is lowered to an inclined position, the braces 14 are arranged at an inclination and their lower ends are supported by the ends of the transverse bottom cleats of the wagon body. The links 17 are also inclined when the parts are arranged to form a hay rack, and they extend upward from the lower ends of the inclined braces 14, as clearly illustrated in Fig. 2 of the drawings. The braces 14, which are arranged in pairs, are spaced apart, and the horizontal bottom cleats 9 are provided at their ends with side recesses 19, presenting inclined faces to the lower ends of the braces 14 and leaving a central projection 20, which interlocks with the pairs of braces and prevents the same from moving laterally on the cleat 9. By this construction the lower ends of the braces are retained in engagement with the cleats 9. When the sides of the hay rack are arranged in a vertical position, the braces and links are also arranged vertical and are located at opposite sides of the connecting bars 4 and the removable standards 6.

The hay rack is equipped at its front with a vertical end or member 21, which is of the ordinary construction, and it is provided at the back with a hinged end 22, adapted to be arranged in either a vertical or an inclined position. When the parts are arranged as a hay rack, the rear member is supported in an inclined position by braces 23, pivoted at their lower ends 24 to the rear end of the wagon body and slidably connected at their upper ends with the hinged rear end 22 by means of a transverse rod 25 and slots 26. The transverse rod, which connects the inclined braces 23, engages the upper end walls of the slots when the rear end 22 is arranged at an inclination, as illustrated in Fig. 1. The hinged sides 1 and the hinged rear end 22 may be secured in a vertical position by any suitable means to form a stock rack.

The hay loader 27 consists of a carriage movable longitudinally of the wagon body to arrange it at the rear portion thereof to receive the first half of a load of hay, and to carry the hay to the front portion of the hay rack to permit the second half of the load to be placed on the rear portion of the hay rack. The carriage is composed of a wheeled frame having laterally extending supporting portions 28 and provided at the front with a vertical end member 29, preferably in the form of a ladder and composed of side uprights and connecting transverse bars. The frame of the hay carriage, which is mounted on front and rear axles 30 and 31, is preferably composed of a horizontal bottom and vertical sides, and the axles 30 and 31 are equipped with flanged wheels 32 and 33, arranged to run on a track located within the wagon body and composed of horizontal rails 34. The rails 34 are in the form of bars or sills, arranged upon the bottom of the wagon body and detachably secured to the sides by means of the inner faces of the sides by means of screws 35, swiveled to plates 36 and engaging threaded apertures 37 of the rails. The wheels are arranged upon the upper edges of the rails, and the frame or body portion of the carriage extends across the wagon body to within a short distance of the sides of the same, sufficient space being left between the sides of the carriage and the sides of the wagon body to provide spaces for the wheels. The upper edges of the sides of the frame or body of the carriage are arranged in the same horizontal plane as the upper edges of the wagon body, and they support transverse bars 38 suitably secured to the sides of the frame and having terminal arms 39, tapered to clear the sides of the hay rack and supporting longitudinal slats, which with the bars 38 form the laterally extending horizontal supporting portions of the carriage. The transversely disposed bars 38 are preferably secured to the sides by means of loops or clips 40, but any other suitable means may be employed, as will be readily understood.

The bottom of the frame or body of the carriage and the laterally extending portions 38 are adapted to support the hay and are of sufficient area to receive one half of the load. The carriage is moved backwardly and forwardly by operating mechanism including an upper windlass 41 and a rope or cable 42, provided with forwardly and rearwardly extending loops 43 and 44, passing through suitable guiding means of the wagon body and adapted to be lengthened and shortened to move the carriage backwardly and forwardly. When the forwardly extending loop 43 is shortened to move the carriage forwardly, the rearwardly extending loop 44 is simultaneously lengthened, as will be readily understood. The windlass consists of a transverse shaft, equipped at one end with a crank handle 45 and carrying a ratchet wheel 46, which is engaged by a spring actuated pawl or dog 47 for holding the carriage stationary. The dog 47 is located above the ratchet wheel and is disposed in an upright position, being pivoted intermediate of its ends between lugs or ears 48. The lower end of the dog engages the ratchet wheel at the top thereof, and a spring 49 is interposed between the upper arm or portion of the dog and a plate 50 for holding the lower arm or portion normally in engagement with the ratchet wheel. The lugs are carried by the plate 50, which forms a bearing for one of the journals or gudgeons of the windlass.

The rope or cable is wound around the windlass, and it has substantially vertical portions 51 and 52, extending downwardly from the windlass at opposite sides thereof. The vertical portion 51 extends downward from the front side of the windlass, and it passes beneath a roller 53 at the bottom of the carriage, and extends rearwardly therefrom to a pulley 54 mounted in a block 55, which is secured to the bottom of the carriage at a point intermediate of the ends thereof. The rope extends forward from the pulley of the carriage to a front pulley 56, mounted in the block or casing 57, which is secured to the wagon body at the front end thereof. The rope or cable extends rearwardly from the pulley 56, and its terminal 58 is secured to the frame of the carriage by means of an eye, or any other suitable means, as clearly illustrated in Fig. 1 of the drawings. The upright portion 51, the forwardly extending loop 43 and the intermediate loop 59 constitute one side or portion of the rope or cable, and when this side of the rope or cable is wound up on the windlass the front loop will be shortened and the carriage will be moved forwardly. The vertical portion 52 of the other side of the rope or cable extends downwardly from the windlass to a lower roller 60, and it passes beneath the same and extends rearwardly to a guide pulley 61, mounted in a block or casing 62, which is secured to the bottom of the wagon body at a point in rear of the center thereof. The rope or cable extends forwardly from the rear pulley 61 to the front axle of the carriage and is suitably secured to the same. The upright portion 52 and the rearwardly extending loop constitute the other side of the rope or cable, and when the windlass is rotated to wind up the upright portion 52, the rearwardly extending loop will be shortened and the carriage will be moved rearwardly. The rear guide pulley is located a sufficient distance back of the center of the wagon body to enable the carriage to be moved backward to the rear end of the wagon body.

The rope or cable may be constructed of either wire or hemp, and any other suitable connection may be employed. The vertical side bars or uprights of the front member 29 of the carriage have depending lower portions 63, provided with suitable bearings for a transverse shaft 64 on which the rollers 53 and 60 are mounted. The transverse rollers 53 and 60 are spaced apart at the center of the front portion of the carriage, as clearly illustrated in Fig. 4 of the drawings.

Having thus fully described my invention, what I claim as new and desire to secure by Letters Patent, is:—

1. A hay rack including a wagon body provided with bottom cleats having intermediate projections, a standard provided with means for detachably engaging a wagon body, a side hinged to the standard, spaced inclined braces pivoted at their inner ends to the hinged side, and spaced links pivotally connected to the lower ends of the braces and to the standard at opposite sides thereof and straddling the intermediate projections of the bottom cleats and held against lateral movement by the same.

2. A hay rack including a wagon body provided with spaced standards and having a bottom socket, a keeper connecting the upper portions of the standards, a removable standard fitted in the said socket and provided with a hook-shaped member engaging the said keeper, a side hinged to the last mentioned standard, and means connected with the hinged side for supporting the same in an inclined position.

3. A hay rack including a wagon body provided with a projecting bottom cleat having opposite recesses forming an intermediate projection, hinged sides provided with standards detachably mounted on the wagon body, braces connected with the hinged sides for supporting the same in an inclined position and arranged to fit in the said recesses at opposite sides of the projection of the bottom cleat, and links connecting the braces with the standards.

4. A hay rack including a wagon body, a cleat projecting from the wagon body and provided with a socket and having a projecting portion, spaced standards fixed to the body above the cleat, a keeper connecting the upper portion to the standards, a removable standard fitted in the socket and provided with the hook for engaging the keeper, a side hinged to the removable standard, inclined braces pivoted at their upper ends to the hinged side and having their lower ends spaced apart to straddle the projection of the said cleat, and links connected with the lower ends of the braces and with the removable standard at a point intermediate of the ends thereof.

5. A hay rack including a wagon body, hinged sides detachably mounted on the wagon body, removable rails secured to the inner faces of the sides of the body and forming a track, and a carriage arranged on the track and provided with means for supporting a portion of a load of hay and movable longitudinally of the wagon body.

6. A hay rack including a wagon body having vertical sides, rails arranged within the body and fitted against the inner faces of the sides thereof and provided with threaded openings, and screws swiveled to the sides of the body and engaging the threaded openings of the rails, and a carriage mounted on the rails and provided with means for supporting a portion of a load of hay.

In testimony that I claim the foregoing as my own, I have hereto affixed my signature in the presence of two witnesses.

JOSEPH WHEATLEY.

Witnesses:
WM. BEGLEY,
JOHN MOSS.